United States Patent
Zhang (10) Patent No.: US 7,519,036 B2
(45) Date of Patent: Apr. 14, 2009

(54) METHOD OF USER ACCESS AUTHORIZATION IN WIRELESS LOCAL AREA NETWORK

(75) Inventor: Wenlin Zhang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 11/260,865

(22) Filed: Oct. 27, 2005

(65) Prior Publication Data

US 2006/0109826 A1 May 25, 2006

Related U.S. Application Data

(63) Continuation of application No. PCT/CN2004/000614, filed on Jun. 7, 2004.

(30) Foreign Application Priority Data

Jun. 6, 2003 (CN) ............... 03 1 40977

(51) Int. Cl.
*H04Q 7/24* (2006.01)
(52) U.S. Cl. ............ 370/338; 713/155; 726/28
(58) Field of Classification Search ......... 370/338, 370/395.2, 395.21, 395.42; 713/155, 168; 726/1–7, 27–30
See application file for complete search history.

(56) References Cited

U.S. PATENT DOCUMENTS 6,430,741 B1 * 8/2002 Mattson et al. ............. 717/154
6,594,483 B2 7/2003 Nykanen et al.
6,957,067 B1 10/2005 Iyer et al.

(Continued)

FOREIGN PATENT DOCUMENTS

CN 1453953 11/2003

(Continued)

OTHER PUBLICATIONS

Ala-Laurila et al., "Wireless LAN access network architecture for mobile operators" *IEEE Communications Magazine IEEE* USA, vol. 39, No. 11, Nov. 2001, pp. 82-89.

(Continued)

*Primary Examiner*—Ricky Ngo
*Assistant Examiner*—Kan Yuen
(74) *Attorney, Agent, or Firm*—Townsend and Townsend and Crew LLP (57) ABSTRACT

The present invention discloses a method of user access authorization in wireless local area networks. The method comprises: when a Wireless Local Area Network (WLAN) user terminal is accessing a WLAN operational network, the WLAN operational network, while authenticating this WLAN user terminal, judging whether to allow this WLAN user terminal to access according to authorization conditions having an impact on the access of this WLAN user terminal, if yes, the WLAN operational network will determine the access rules of this WLAN user terminal according to the said authorization conditions; otherwise, the WLAN operational network will notify the WLAN user terminal about the failure. By adopting the method of the present invention, different users can be controlled to access the network according to different authorization conditions, and be restricted by different access rules after getting accessed. As a result, the access control capability of a wireless local area network is enhanced and the working efficiency of the network is improved.

24 Claims, 3 Drawing Sheets

U.S. PATENT DOCUMENTS

| | | | |
|---|---|---|---|
| 7,120,129 B2 * | 10/2006 | Ayyagari et al. | 370/255 |
| 7,136,912 B2 * | 11/2006 | Hotti | 709/223 |
| 2001/0043577 A1 * | 11/2001 | Barany et al. | 370/328 |
| 2002/0037708 A1 | 3/2002 | McCann et al. | |
| 2003/0166397 A1 * | 9/2003 | Aura | 455/410 |
| 2004/0008672 A1 * | 1/2004 | Kobylarz et al. | 370/352 |
| 2004/0066769 A1 * | 4/2004 | Ahmavaara et al. | 370/338 |
| 2004/0076128 A1 * | 4/2004 | Rao et al. | 370/328 |
| 2004/0156372 A1 * | 8/2004 | Hussa | 370/401 |
| 2004/0246933 A1 * | 12/2004 | Valko et al. | 370/338 |
| 2007/0014270 A1 * | 1/2007 | Unruh | 370/338 |
| 2008/0184353 A1 * | 7/2008 | Carroll et al. | 726/7 |

FOREIGN PATENT DOCUMENTS

| | | |
|---|---|---|
| CN | 1474535 | 2/2004 |
| JP | 2001-274845 A | 10/2001 |
| JP | 2002-152276 | 5/2002 |
| JP | 2002-157181 A | 5/2002 |
| KR | 2001-0090038 | 10/2001 |
| WO | WO 02/11467 A2 | 2/2002 |
| WO | WO 02/082730 | 10/2002 |
| WO | WO 03/038670 | 5/2003 |
| WO | WO 2004/077754 | 9/2004 |

OTHER PUBLICATIONS

Buddhikot et al. "Integration of 802.11 and third-generation wireless data networks" *IEEE INFOCOM 2003*. Twenty-Second Annual Joint Conference of the IEEE Computer and Communications Societies, NJ, USA, vol. 1, Mar. 20, 2003, pp. 503-512.

Zhang et al., "Virtual operator based AAA in wireless LAN hot spots with ad-hoc networking support" *Sigmobile Mob. Comput. Commun. Rev.*, Online, vol. 6, No. 3, Jul. 2002, pp. 10-21, Retrieved from the Internet: URL:http://portal.acm.org/>.

Jajodia et al., "A unified framework for enforcing multiple access control policies,"; International Conference on Management of Data, Proceedings of the 1997 ACM SIGMOD international conference on Management of data; Publication Date: 1997.

Japanese Office Action JP 2006-508099.

* cited by examiner

METHOD OF USER ACCESS AUTHORIZATION IN WIRELESS LOCAL AREA NETWORK

CROSS-REFERENCE TO RELATED APPLICATIONS

This application is a continuation of International Application No. PCT/CN2004/000614 filed on Jun. 7, 2004. This application claims the benefit of Chinese Patent Application No. 03140977.6 filed on Jun. 6, 2003. The disclosures of the above applications are incorporated herein by reference.

FIELD OF THE INVENTION

The present invention relates to authentication and authorization techniques in network, more particularly to a method for access authorization of a user in the operational network of Wireless Local Area Network (WLAN).

BACKGROUND OF THE INVENTION

With users' higher and higher requirements for wireless access rate, Wireless Local Area Network (WLAN) emerges as the times require, which can provide high-rate wireless data access in a small area. WLAN incorporates various techniques, among which a widely applied technical standard is IEEE 802.11b, which adopts 2.4 GHz frequency band and the highest data transmission rate thereof can be as high as 11 Mbps. IEEE 802.11g and Bluetooth technology also adopt this frequency band and the highest data transmission rate of 802.11 g can be as high as 54 Mbps. Other new standards like IEEE 802.11 a and ETSI BRAN Hiperlan2 adopt 5 GHz frequency band, and the highest transmission rate can also be as high as 54 Mbps.

Although there are various wireless access techniques, most WLAN are used to transmit Internet Protocol (IP) data packet. As for a wireless IP network, the specific WLAN access technique adopted is transparent to upper hierarchy IP. Users access a wireless IP network through Access Points (AP), and the network control and connection devices are connected to constitute an IP transmission network.

With the rising and development of WLAN technology, intercommunication between WLAN and various wireless mobile communication networks becomes the current research focus, wherein the wireless mobile communication network can be Global System for Mobile communications (GSM), Code Division Multiple Access (CDMA) system, Wideband Code Division Multiple Access (WCDMA) system, Time Division-Synchronous Code Division Multiple Access (TD-SCDMA) system and CDMA2000 system. With the Third Generation Partnership Project (3GPP) standards, a user terminal can be connected to the Internet or Intranet through WLAN access network, or be connected to home network of 3GPP system or visited network of 3GPP system through WLAN access network. Specifically speaking, when getting accessed locally, a WLAN user terminal is connected to 3GPP home network through a WLAN access network; when roaming, the WLAN user terminal is connected to 3GPP visited network through a WLAN access network. Some of the entities in 3GPP visited network are interconnected with corresponding entities which have the same functions in 3GPP home network, for instance, 3GPP Authentication Authorization and Accounting (AAA) Proxy in 3GPP visited network and 3GPP Authentication Authorization and Accounting (AAA) Server in 3GPP home network; WLAN Access Gateway (WAG) in 3GPP visited network and Packet Data Gateway (PDG) in 3GPP home network, and so on, as shown in FIG. 1.

Figure 1:
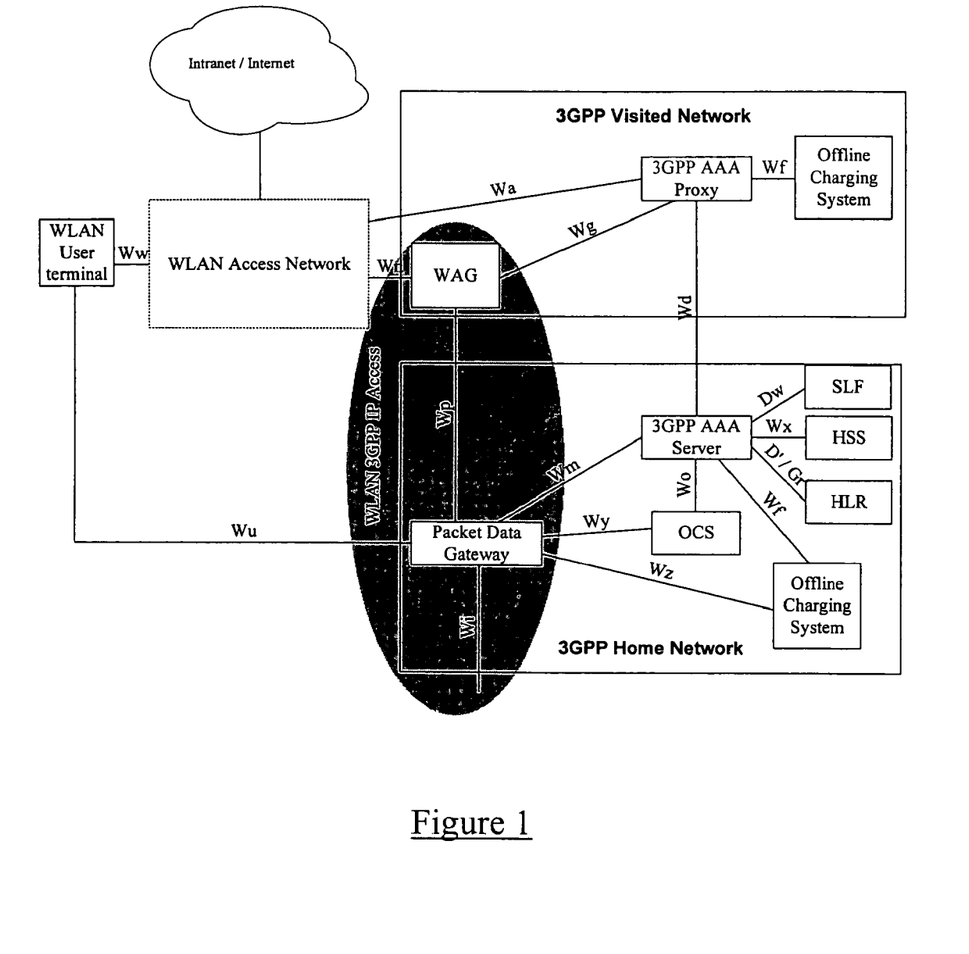
FIG. 1 is a schematic diagram illustrating network structure of inter-working WLAN and 3GPP system.

As shown in FIG. 1, 3GPP system is mainly composed of Home Subscriber Server (HSS)/Home Location Register (HLR), 3GPP AAA Server, 3GPP AAA Proxy, WAG, Packet Data Gateway, Offline Charging System and Online Charging System (OCS). WLAN user terminal (WLAN UE), WLAN access network and all entities of 3GPP system constitute a 3GPP-WLAN interworking network, and this 3GPP-WLAN interworking network can be taken as a WLAN service system. 3GPP AAA Server takes charge of authentication, authorization and accounting of the user, as well as collecting the charging information transmitted by WLAN access network and transmitting the collected information to charging system. Packet Data Gateway takes charge of transmitting user data from WLAN access network to 3GPP network or to other packet networks. Charging system mainly receives and records the user's charging information transmitted from the network. OCS system guides the network to transmit online charging information periodically according to the expenses of an online charged user, and makes appropriate statistics and control operations.

In normal conditions, when a WLAN user terminal desires to access a 3GPP-WLAN network, this user terminal will send an access request to corresponding access authentication unit in 3GPP-WLAN network through WLAN access network; the access authentication unit, which is usually a 3GPP AAA Server, authenticates the request after receiving it. If the request passes the authentication, all ports will simply be opened to this user terminal. However, the structure of an operational WLAN is much more complicated than the simplified network structure shown in FIG. 1. Here, said operational WLAN refers to a WLAN that can be operated and managed, which will not only perform authentication, authorization and accounting of a user, but also provide one or more than one kind of network access and network-based service, for example, various local area network (LAN) services like LAN inside local hotels or airports and LAN games, as well as access to a LAN that can provide different services, Internet access and services based on 3GPP packet network.

Because an operational WLAN can access to different LANs at the same time and the operational rules are comparatively complicated, different access rules may be set according to the user's account and accessing time. Therefore, the traditional method of access authorization based only on the authentication result is incontrollable and inconvenient for operation.

SUMMARY OF THE INVENTION

Therefore, the main object of the present invention is to provide a method of user access authorization in WLAN, with which different user terminals can be controlled to access WLAN under different restrictive conditions, thereby access control capability of WLAN can be enhanced, and operational efficiency of the network can be improved.

To obtain the above object, the technical scheme of the present invention is as follows:

A method of user access authorization in wireless local area network, comprising:

When a Wireless Local Area Network (WLAN) user terminal is accessing to a WLAN operational network, while authenticating this WLAN user terminal, the WLAN operational network judging whether this WLAN user terminal is allowed to access according to the authorization conditions having an impact on the access of this WLAN user terminal, if allowed, determining the access rules of this WLAN user terminal according to said authorization conditions; otherwise, notifying the WLAN user terminal about the failure.

The method further comprises: sending the determined access rules to one or more than one related entity implementing access rules so as to implement the restriction on the access of the user terminal.

In the foregoing scheme, the process of authentication and authorization of a WLAN user terminal is: after a WLAN user terminal sends an access request to the WLAN operational network, the WLAN operational network performs legality authentication of the current WLAN user terminal getting accessed, if the WLAN user terminal passes the authentication, the WLAN operational network continues to judge whether this WLAN user terminal is allowed to access according to the authorization conditions; otherwise, the WLAN operational network transmits access failure information to this WLAN user terminal.

The said authorization conditions having an impact on the access of the WLAN user terminal comprise: conditions of user account, user subscription information, operational rules, or any combination of the former three. The said user subscription information comprises a designation list of network services that the user can access. The said access rules are determined by the AAA server in the WLAN operational network.

Said access rules are restrictive conditions used for determining access area or path of the current user terminal, or restrictive conditions used for determining the access time of the current user terminal, or null, namely there is no restrictive condition for the access of the user terminal.

The implementing entity of the said access rule is AAA, WLAN Access Gateway (WAG), Access Controller (AC), Access Point (AP) or a user terminal. If the implementing entity is a user terminal, the method further comprises: after the access rules are determined, the network transmits to the user terminal at the same time the access authentication and authorization success information of the current WLAN user terminal and the access rules which the user terminal needs to be informed of.

In the above scheme, said WLAN operational network is a 3GPP-WLAN interworking network, a 3GPP2-WLAN interworking network, or other operational WLANs with subscribed users.

It can be seen from the above scheme that, key of the present invention lies in: when a WLAN user terminal is accessing to a WLAN operational network, while authenticating this user terminal, the network judges whether this user terminal is allowed to access according to the authorization conditions of this user terminal, determines the corresponding access rules for this user terminal according to the authorization conditions, and then restricts the area, path, or time of access of the user in subsequent procedures or subsequent service applications according to the determined access rules.

Therefore, in the method provided by the present invention, the access control on a user terminal comprises not only legality authentication, but also determination of other authorization conditions and the access rules customized according to the authorization conditions. Therefore, different WLAN user terminals will access the WLAN operational network according to different authorization conditions, and be restricted by different access rules after the access. Accordingly access authorization capability of WLAN is enhanced. In addition, when a WLAN user terminal requests the WLAN operational network for a service, the WLAN operational network will treat the user terminal according to the corresponding access rules, and provides services for the current accessing user terminal only in the restrictive area, path and time. Accordingly network operational capability and operation efficiency can be enhanced, and the network can provide network access of different areas, or different paths, or different time for the same user or different users, thereby facilitates access management and makes diversified services possible.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

To make the object, technical scheme and advantages of the present invention clearer, the present invention will be described in detail hereinafter with reference to the accompanying drawings and specific embodiments.

Figure 2:
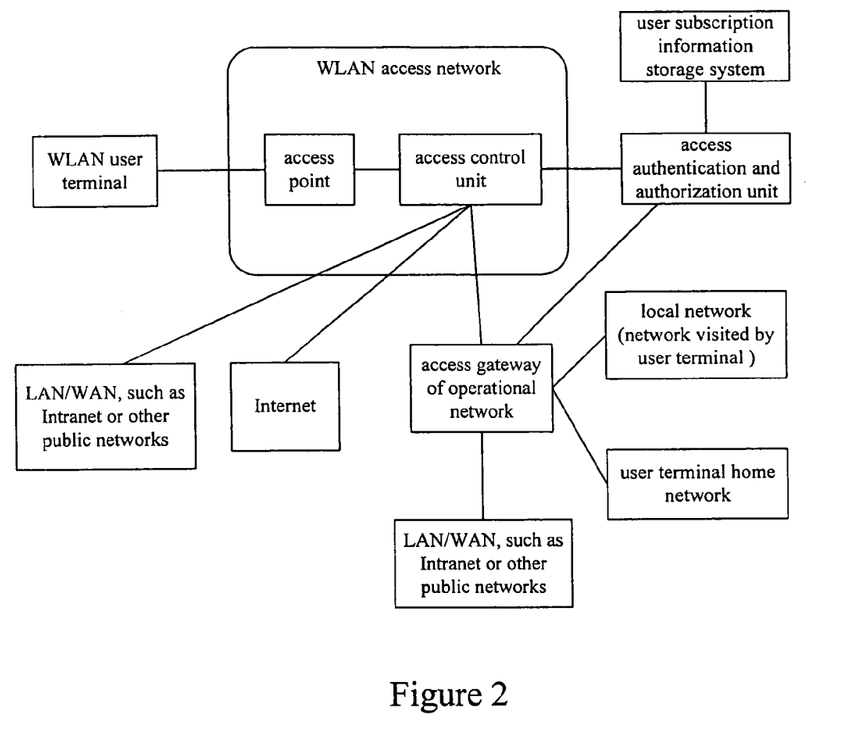
FIG. 2 is a schematic diagram illustrating a networking structure of WLAN operational network.

FIG. 2 is a schematic diagram illustrating a networking structure of WLAN operational network. As shown in FIG. 2, the WLAN in FIG. 2 is an operational WLAN, in which, the WLAN access network is not only directly connected to wide area networks, like Internet, other Intranets, and wide-area private networks, but also connected, directly or through the access gateway of the operational network, to various networks, for example, local area networks inside local hotels or airports and mobile operational networks such as 3GPP PS domain. The said mobile operational networks can be wide area networks or local area networks. The access gateway of an operational network is connected at the same time to the home network and visited network of the current user terminal as well as to a WLAN access authentication and authorization unit, for example, 3GPP AAA Server.

For a WLAN user terminal desiring a certain service through the WLAN operational network, access to certain networks directly or through a gateway by this user terminal may have been restricted at the time of subscription based on the principle of diversified services. For instance, the user terminal may not be allowed to access the Intranet inside an airport connected with the WLAN access network, but can access the Internet, or the user terminal has to access the Internet and certain private networks through subscription; or this WLAN user terminal is dynamically restricted from accessing some special networks directly or through an access gateway during a certain period or in a certain area according to such conditions as account information of the user terminal, managing or operational rules of the operator. Therefore, when accessing a WLAN operational network, a user terminal should be restricted by access rules according to conditions having impact on authorization, and these access rules should be applied to relevant switching or routing gateways of the network, rather than being authorized to access only according to the authentication result.

In practical applications, said access authorization in the present invention does not refer to the service authorization associated to a mobile network. Said access authorization is used to determine whether a user terminal is allowed to access or under what condition can a user terminal access a certain network before the service authorization. As to whether the current accessing WLAN user terminal can use the relevant services, it is to be judged by subsequent service authorization procedures. Difference between access authorization and service authorization is herein described with an example: Suppose that a user terminal applies for Internet access while the current network can provide two kinds of Internet access, one is to directly access the Internet through the WLAN access network, the other is to access the Internet through the WLAN access network and then through WAG, then, if there is no access restriction on the current user terminal, the user terminal can arbitrarily select one of the two accessing modes, or leave it to the service authorization to determine which accessing mode to adopt; however, if restricted from directly accessing the Internet through WLAN access network, the current user terminal can access the Internet only through WAG, while whether this user terminal can be allowed of Internet services is to be determined by the service authorization.

Figure 3:
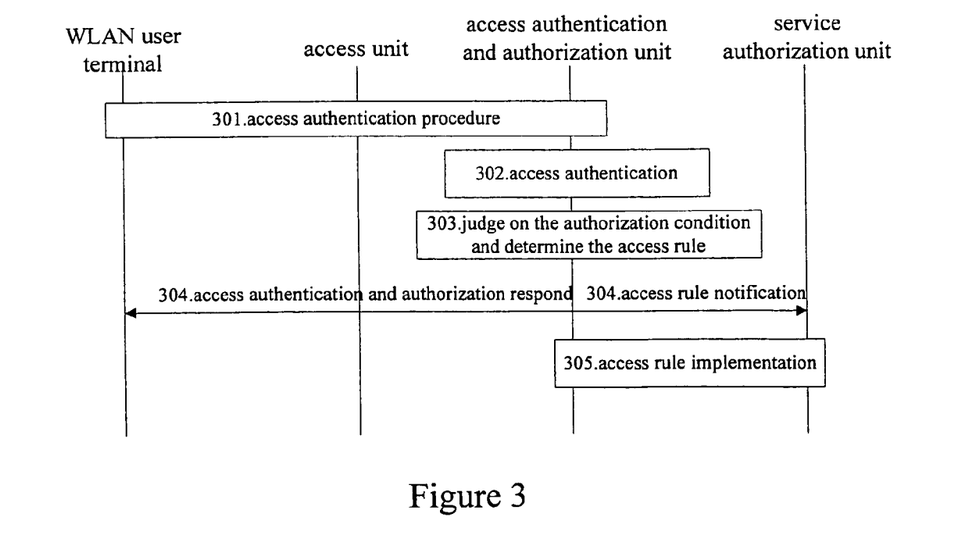
FIG. 3 is a flowchart illustrating the access authentication and authorization by WLAN operational network in accordance with the present invention.

The access authorization procedure for a user terminal in the present invention is shown in FIG. 3, which comprises the following steps:

Step 301~302: when a WLAN user terminal requests to access a network, the network performs access authentication for this user terminal. Specifically speaking, the access authentication and authorization unit in the network starts a legality authentication procedure between the user terminal and the network through the access control unit: the user terminal transmitting the required authentication information to the access authentication and authorization unit through the access control unit; after receiving the relevant information of the user terminal, the access authentication and authorization unit implementing access authentication by itself, if the authentication is successful, going to the next step, otherwise notifying the user terminal about the failure of the access authentication and then ending the current access authentication procedure. The access control unit here can be an Access Controller (AC) in a WLAN access network, a WLAN access gateway (WAG) or the combination of the former two; the access authentication and authorization unit can be a 3GPP AAA Server.

Step 303: after the access authentication of the user terminal is successful, the access authentication and authorization unit judges whether to allow this user terminal to access according to the authorization conditions of the current user terminal, if not allowed, notifying this user terminal about the failure of access authorization and then ending the current access authorization procedure; otherwise, determining the access rules of the current accessing user terminal according to the authorization conditions thereof, wherein the access rules indicate what restricting principles effect when the authorized user terminal is getting accessed. Said authorization conditions comprise: user account information, user subscription data, operational rules of operators, or any combination of the former three. Said access rules mainly refer to the restriction on the network scope or paths to be accessed, for instance: the accessible gateway and area connected with the network, the network equipment for access. The rules may also comprise restrictions on access time. The access authentication and authorization unit can directly set the access rule as null, which indicates there is no special restriction on the access of this user terminal.

The said user subscription data can be the designation list of accessible services the user has subscribed to, for instance, Internet, local game network, Starbuck chain network, IPv6-Internet, and so on.

Step 304: after determining the access rules, on one hand, the access authentication and authorization unit notifies the user terminal and access control unit about successful access authentication and authorization for the user terminal and stores the determined access rules; on the other hand, the access authentication and authorization unit notifies each related entity implementing access rules about the determined access rules, the related entity implementing access rules herein refers to one or more network entities that can perform these rules, such as the 3GPP-AAA, the service authorization unit, AC, AP, DHCP unit, the access gateway of the operational network, and so on. The access authentication and authorization unit may also notify the user terminal about all or part of the determined access rules; thereby the user terminal can know or assist in implementing said access rules. The notification about the access rules can be sent to the user terminal with the notification about the success of access authentication and authorization.

Step 305: The entity implementing access rules, such as the service authorization unit shown in FIG. 3, stores the rules after receiving them and performs access rules when the user terminal applies for a WLAN network service through this entity. For instance, according to the access rules, the service authorization unit can judge whether to allow a current user terminal to access a specified network area during this time period and determine where it should get accessed from. Generally, the service authorization unit and the access authorization unit are both in AAA.

Specific access rules can be implemented through the existing methods like filtering technique, IP allocation scheme, Virtual Local Area Network (VLAN), subnet division, Virtual Private Network (VPN), user layer-2 separation, and so on. For example, by means of VLAN technique or IP allocation, the access control unit can put the current user terminal applying for the service under a subnet complying with the access rules, or allocate an independent subnet address to the current user terminal applying for the service such that this user terminal can only access the subnet or the area specified by VLAN. When the access rules are implemented by the service authorization unit, if the user has requested for the relevant services, the service authorization unit will judge whether the requested services meet the requirement of the access rules corresponding to the current user terminal; if the request does not comply with the access rules, it will be rejected before the service authorization.

The access authorization in accordance with the present invention is performed when the user accesses a WLAN operational network, generally after the network finishes the identity legality authentication of the current accessing user terminal, as described in step 301~305. It is obvious that the access authorization may be performed before the authentication of the user, i.e. first judging on the authorization conditions of the current accessing user terminal and determining the access rules, and then executing the identity legality authentication, only that the process is relatively complicated. When the user terminal is being notified, authentication result and authorization result are usually carried in one notifying message, for example, EAP-success message of EAP protocol. Authentication result and authorization result can also be informed separately, for example, informing the authentication result before informing the authorization result. Said WLAN operational network in the present invention comprises a 3GPP-WLAN interworking network, a 3GPP2-WLAN interworking network, or other operational WLAN networks with subscribed users.

Figure 4:
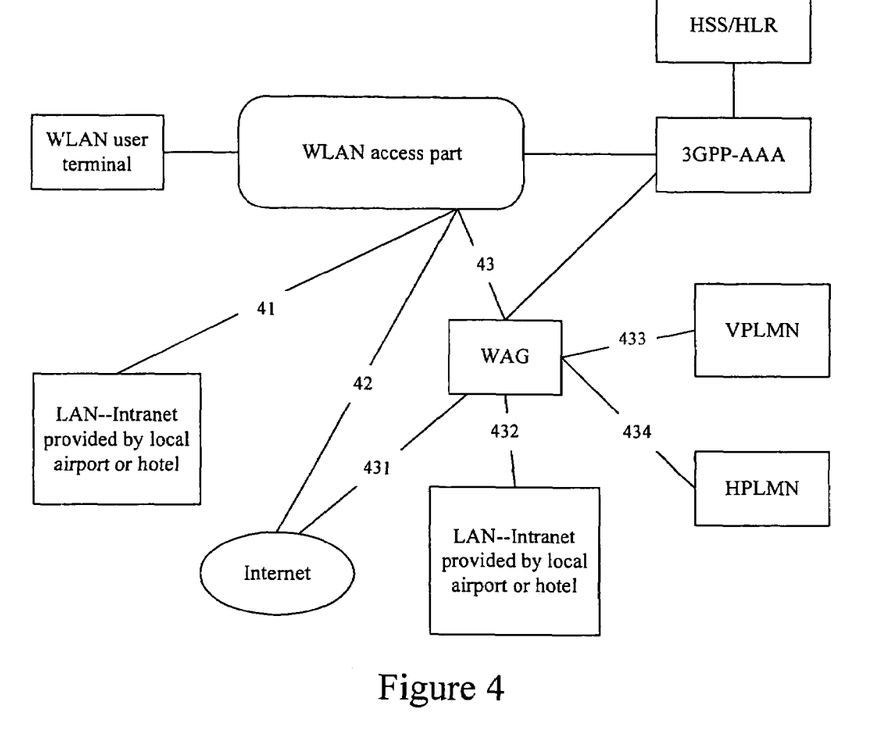
FIG. 4 is a schematic diagram illustrating the networking structure of WLAN operational network in an embodiment of the present invention.

FIG. 4 is a schematic diagram illustrating the networking structure of WLAN operational network in an embodiment of the present invention. As shown in FIG. 4, in this 3GPP-WLAN interworking operational network, 3GPP-AAA is the access authentication and authorization unit; the WLAN access part is mainly composed of AC and AP; and AC, WAG, or the combination of AC and WAG is the access control unit. Through the WLAN access part, the WLAN operational network can directly provide local area network service 41 and Internet access service 42 for WLAN user terminals in some hot spots like airport and hotels. Through the WLAN access part and WAG, the WLAN operational network can also provide 3GPP-specific service 43 for WLAN user terminals by accessing to a 3GPP operational network. This WLAN operational network also includes HSS/HLR, which is used to store various information of the user terminal, such as the subscription information.

With reference to FIG. 4 again, the 3GPP-specific service 43 that a WLAN user terminal can obtain through the WLAN operational network comprises: Internet access service 431 provided by the 3GPP network operator through WAG, feature local area network service 432, and the mobile services based on the packet switched (PS) domain of a mobile network, such as various services of the Visited Public Land Mobile Network (VPLMN) 433 and those of HPLMN 434. Internet access service 431 can provide a bandwidth wider than that of direct Internet access in hot spots. In another word, when providing the same service, Internet access service 431 is much faster than Internet access service 42, but the former may be more expensive than the latter. Feature local area network service 432 mainly means that the private network of an operator can provide such internal interactive feature services as management or game for the user terminals. Said various mobile services 433 and 434 comprise at least such feature services of mobile network as IP Multimedia Subsystem (IMS) service, Short Message Service (SMS), Multimedia Message Service (MMS), and LoCation Service (LCS).

First Embodiment

Figure 5:
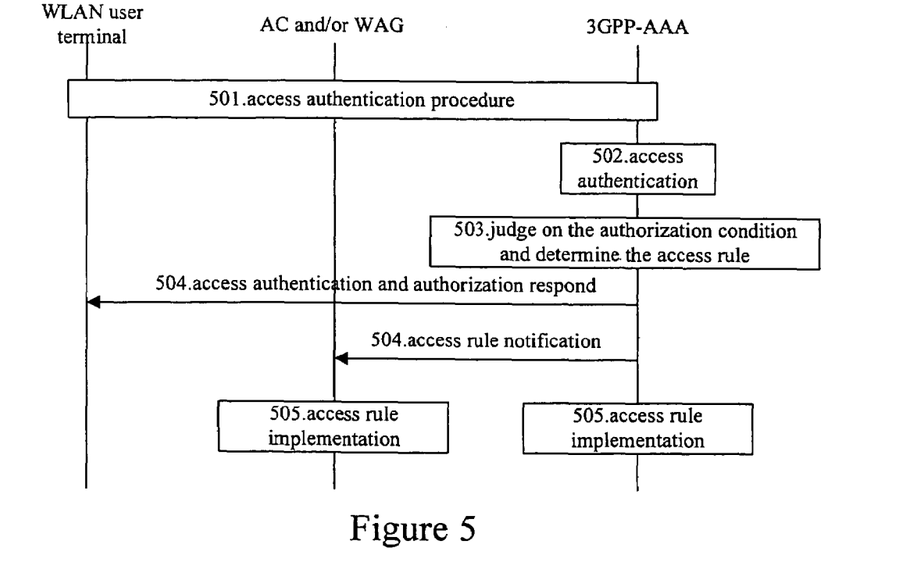
FIG. 5 is the flowchart of access authentication and authorization in the embodiment shown in FIG. 4.

Based on the networking structure shown in FIG. 4, assuming that user terminal A has only subscribed to local Internet service in a hot-spot area and there is only Internet service in the access authorization list of the user subscription information, then, as shown in FIG. 5, the access authorization procedure for user terminal A is as follows:

Step 501~502: when requesting to access a 3GPP-WLAN network as shown in FIG. 4, user terminal A sends an access request and information required for authentication to 3GPP-AAA through AC; and then 3GPP-AAA authenticates the identity legality of user terminal A, if user terminal A passes the authentication, execute step 503 and continue to judge on the authorization conditions of user terminal A; otherwise, return the access authentication failure information to user terminal A, and end the procedure.

Step 503: 3GPP-AAA judges whether to allow user terminal A to access according to all the authorization conditions thereof, if it is not allowed, 3GPP-AAA returns the access authorization failure information to user terminal A, and ends the procedure; otherwise, 3GPP-AAA determines the access rules of user terminal A according to the authorization conditions thereof. Thus, according to the subscription data of user terminal A, the access rules of user terminal A are determined as "access only the local Internet of the hot-spot area".

Step 504: 3GPP-AAA notifies user terminal A of the success of access authentication and authorization as well as the access rules determined in step 503, and notifies the AC of the WLAN access network such that the AC could implement the access rules.

Step 505: AC stores the determined access rules after receiving it, when this user terminal applies for Internet services, according to the pre-stored access rules, AC learns this user terminal can only access local Internet in the hot-spot area, and judges whether the user terminal is currently located in the hot-spot area, if yes, get the user terminal directly accessed to local Internet through AC; otherwise, by means of VLAN technique or IP allocation, AC puts the user terminal in a subnet that can only be connected to local Internet in the hot-spot area or allocates an independent subnet address for user terminal A, wherein the subnet is only allowed to access local Internet. Accordingly user terminal A can only access local Internet.

Second Embodiment

Based on the networking structure as shown in FIG. 4, assuming that user terminal B is only allowed to access the network through WAG and forbidden to get accessed locally in a hot-spot area. As shown in FIG. 5, the access authorization procedure of user terminal B is essentially the same as that of user terminal A in the first embodiment, except that the access rules of user terminal B is determined as "allowed to access through WAG, forbidden to get a local access in a hot-spot area" in step 503. In this way, in step 505, AC will control user terminal B to access WAG only and will not allow terminal B to connect with other networks. When user terminal B applies for Internet services, Internet access service 42 cannot be used by user terminal B while only Internet access service 431 is available, namely, user terminal B can only access a 3GPP operational network through WAG to enjoy the Internet access service provided by a 3GPP operational network.

Third Embodiment

Based on the networking structure as shown in FIG. 4, assuming that user terminal C is not allowed to access the Visited Public Land Mobile Network (VPLMN). As shown in FIG. 5, the access authorization procedure of user terminal C is essentially the same as that of user terminal A in the first embodiment, except that the access rules of user terminal C is determined as "not allowed to access the visited public land mobile network" in step 503. Based on the access rules, user terminal C has more access rights and can access various networks connected with the WLAN access network according to its service requests, except the visited public land mobile network. The access rules can be implemented in WAG so that the user can not access the visited public land mobile network, or directly implemented in 3GPP-AAA. For instance, when user terminal C requests for a relevant service, it will be judged according to the access rules of user terminal C whether the requested service conforms to the access rules thereof, if not, namely, user terminal C is currently located in a visited public land mobile network and is requesting for a service provided by this visited public land mobile network, reject this request before the service authorization; otherwise, continue with the service authorization.

The above description is just preferable embodiments of the present invention, and is not used to confine the protection scope of this invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of user access authorization in a wireless local area network, comprising:
   when a Wireless Local Area Network (WLAN) user terminal is accessing a WLAN operational network,
   an authentication procedure including authenticating the WLAN user terminal;
   an authorization procedure to access the WLAN operational network before a service authorization including:
      verifying whether to allow the WLAN user terminal to access the WLAN operational network according to authorization conditions, and
      determining access rules of the WLAN user terminal according to the authorization conditions if the WLAN user terminal is allowed to access the WLAN operational network, wherein the access rules including a limitation rule on the access of the WLAN user terminal to the WLAN operational network, wherein the service authorization determines whether the WLAN terminal user has access to a service;
   implementing restriction on the access to the WLAN operational network of the WLAN user terminal according to the access rules;
   sending the determined access rules to one or more than one related entity implementing the access rules so as to implement the restriction on the access of the WLAN user terminal;
   after the WLAN user terminal sends an access request to the WLAN operational network, the WLAN operational network first performing the legality authentication of the currently accessing WLAN user terminal, if the WLAN user terminal passes the legality authentication, judging whether the WLAN user terminal is allowed to access according to the authorization conditions; and
   otherwise, sending the information of the access failure to the WLAN user terminal.

2. A method according to claim 1, further comprising:
   after the WLAN user terminal sends an access request to the WLAN operational network, the WLAN operational network first performing the legality authentication of the currently accessing WLAN user terminal, if the WLAN user terminal passes the authentication, judging whether the WLAN user terminal is allowed to access according to the authorization conditions; otherwise, sending the information of access failure to the WLAN user terminal.

3. A method according to claim 1, wherein the said authorization conditions comprises:
   conditions of user account user subscription information, operational rules, or any combination of the former.

4. A method according to claim 3, wherein the said user subscription information comprises a designation list of user accessible network services.

5. A method according to claim 1, wherein determining the said access rules are implemented by the Authentication Authorization and Accounting (AAA) server of the WLAN operational network.

6. A method according to claim 1, wherein the access rules include access scope limitation, access paths limitation, and/or time limitation.

7. A method according to claim 1, wherein the said access rule is determined as null.

8. A method according to claim 1, wherein the said related entity implementing access rules comprises AAA, WLAN Access gateway (WAG), Access Controller (AC), Access Point (AP), or a WLAN user terminal.

9. A method according to claim 8, further comprising:
   after the access rules are determined, the network sending to the WLAN user terminal at the same time the information about the success of access authentication and authorization of the current WLAN user terminal as well as the access rules that the WLAN user terminal needs to be informed of.

10. A method according to claim 1, wherein the said WLAN operational network is a 3rd Generation Partnership Project Wireless Local Area Network (3GPP-WLAN) interworking network or a 3rd Generation Partnership Project 2Wireless Local Area Network (3GPP2-WLAN) interworking network.

11. A method for controlling an access of a subscriber in a wireless local area network, comprising:
   receiving a request for accessing a wireless local area network(WLAN) operational network from a user terminal;
   an access authentication procedure in response to the access request, the access authentication procedure comprising authenticating the subscriber of the user terminal; and
   an access authorization procedure to the WLAN operational network upon the success of the access authentication and before a service authorization, the access authorization procedure comprising:
      checking whether the subscriber is allowed to access based on an access authorization condition of the user terminal;
      determining access rules being applied to the subscriber based on the access authorization condition so as to control the access of the user terminal, wherein the access rules include restrictions regarding the access of the subscriber to the WLAN operational network, wherein the service authorization determines whether the WLAN terminal user has access to a service;
   implementing restriction on the access of the user terminal according to the access rules;
   sending the determined access rules to one or more than one related entity implementing the access rules so as to implement the restriction on the access of the WLAN user terminal;
   after the WLAN user terminal sends an access request to the WLAN operational network, the WLAN operational network first performing the legality authentication of the currently accessing WLAN user terminal, if the WLAN user terminal passes the legality authentication, judging whether the WLAN user terminal is allowed to access according to the authorization conditions; and
   otherwise, sending the information of the access failure to the WLAN user terminal.

12. A method of claim 11, wherein the access authorization condition comprises the subscriber's subscription information, the subscriber's account information, or operation and manage rules.

13. A method of claim 11 further comprising:
deploying the decided access rules in one or more network entity so as to implement the restriction on the access of the subscriber, wherein the network entity comprising a AAA server in the network, a WLAN access gateway (WAG), a access controller (AC), access point (AP) or the subscriber's terminal.

14. A method of claim 11, wherein the access rules include one or more of access scope limitation, access time limitation, and access path.

15. A method of claim 11 further comprising implementing the decided rules by using a scheme selected from a group consisting of IP allocation scheme, virtual local area network (VLAN) allocation, and filtering.

16. A method of claim 11 further comprising a service authorization process after the access authorization procedure.

17. A system in a wireless local area network (WLAN) operational network comprising:
an access authentication and authorization device capable of communicating with a user terminal and configured to implement a method comprising:
when a subscriber of the user terminal is accessing the WLAN operational network,
an access authentication procedure for authenticating the subscriber; and
an access authorization procedure before a service authorization comprising:
verifying whether the subscriber is allowed to access the WLAN operational network according to an access authorization condition of the subscriber,
deciding an access policy being applied to the user terminal according to the access authorization condition if the subscriber is allowed to access the WLAN operational network; and
implementing restriction on the access to the WLAN operational network of the user terminal according to the access policy,
wherein the access policy includes limitation on the access of the subscriber to the WLAN operational network,
wherein the access authorization procedure occurs after the success of the access authentication procedure, and
wherein the service authorization determines whether the WLAN terminal user has access to a service;
sending the determined access rules to one or more than one related entity implementing the access rules so as to implement the restriction on the access of the WLAN user terminal;
after the WLAN user terminal sends an access request to the WLAN operational network, the WLAN operational network first performing the legality authentication of the currently accessing WLAN user terminal, if the WLAN user terminal passes the legality authentication, judging whether the WLAN user terminal is allowed to access according to the authorization conditions; and
otherwise, sending the information of the access failure to the WLAN user terminal.

18. A system of claim 17, wherein the access authentication and authorization device is further configured to notify at least one of an access authentication result and an access authorization result to the subscriber.

19. A system of claim 17, wherein the access authentication and authorization device is further configured to send the access policy to at least one of an AAA server, a WLAG access gateway (WAG), a service authorization unit, the user terminal and a WLAN access network which is capable of implementing the access policy to implement the limitation on the access according to the access policy.

20. A system of claim 17, wherein the access authentication and authorization device is an authentication, authorization, and accounting (AAA) server in the WLAN operational network.

21. A system of claim 20, wherein the AAA server is coupled with a WLAN access network (WLAN AN) through which the WLAN directly communicates with at least one of a local intranet network and an internet associated with hot spots so as to provide at least one of a local intranet service and an internet service for the user terminal in the hot spots.

22. A system of claim 21, wherein the AAA sever is coupled with a WLAN Access Gateway (WAG) in the WLAN connecting with the WLAN AN and a 3GPP operational network, and the WLAN communicates with the 3GPP network so as to provide a 3GPP-specific service for the subscriber through the WLAN AN and in turn the WAG.

23. A system comprising:
a subscriber terminal communicable with a wireless local area network (WLAN) operational network and configured to
send a request to the WLAN operational network for accessing the WLAN operational network,
wherein the WLAN operational network is configured to perform an access authentication procedure and an access authorization procedure before a service authorization for a subscriber of the subscriber terminal upon receiving the request, and
wherein the access authorization procedure includes:
checking whether the subscriber is allowed to access the WLAN operational network according to an access authorization condition of the subscriber;
deciding access rules applied to the subscriber based on the access authorization condition, wherein the subscriber terminal is further configured to receive a response from the WLAN, and the response includes at least one of an access authentication result and an access authorization result;
implement restriction on the access of the subscriber terminal according to the access rules, wherein the service authorization determines whether the WLAN terminal user has access to a service;
implement restriction on the access of the user terminal according to the access rules;
send the determined access rules to one or more than one related entity implementing the access rules so as to implement the restriction on the access of the WLAN user terminal;
after the WLAN user terminal sends an access request to the WLAN operational network, the WLAN operational network first performing the legality authentication of the currently accessing WLAN user terminal, if the WLAN user terminal passes the legality authentication, judge whether the WLAN user terminal is allowed to access according to the authorization conditions; and
otherwise, send the information of the access failure to the WLAN user terminal.

24. A system of claim 23, wherein the subscriber terminal is further configured to receive the access rules from the WLAN.

* * * * *